Sept. 24, 1940. F. M. WALKER 2,215,677
STEERING WHEEL
Filed Oct. 20, 1938
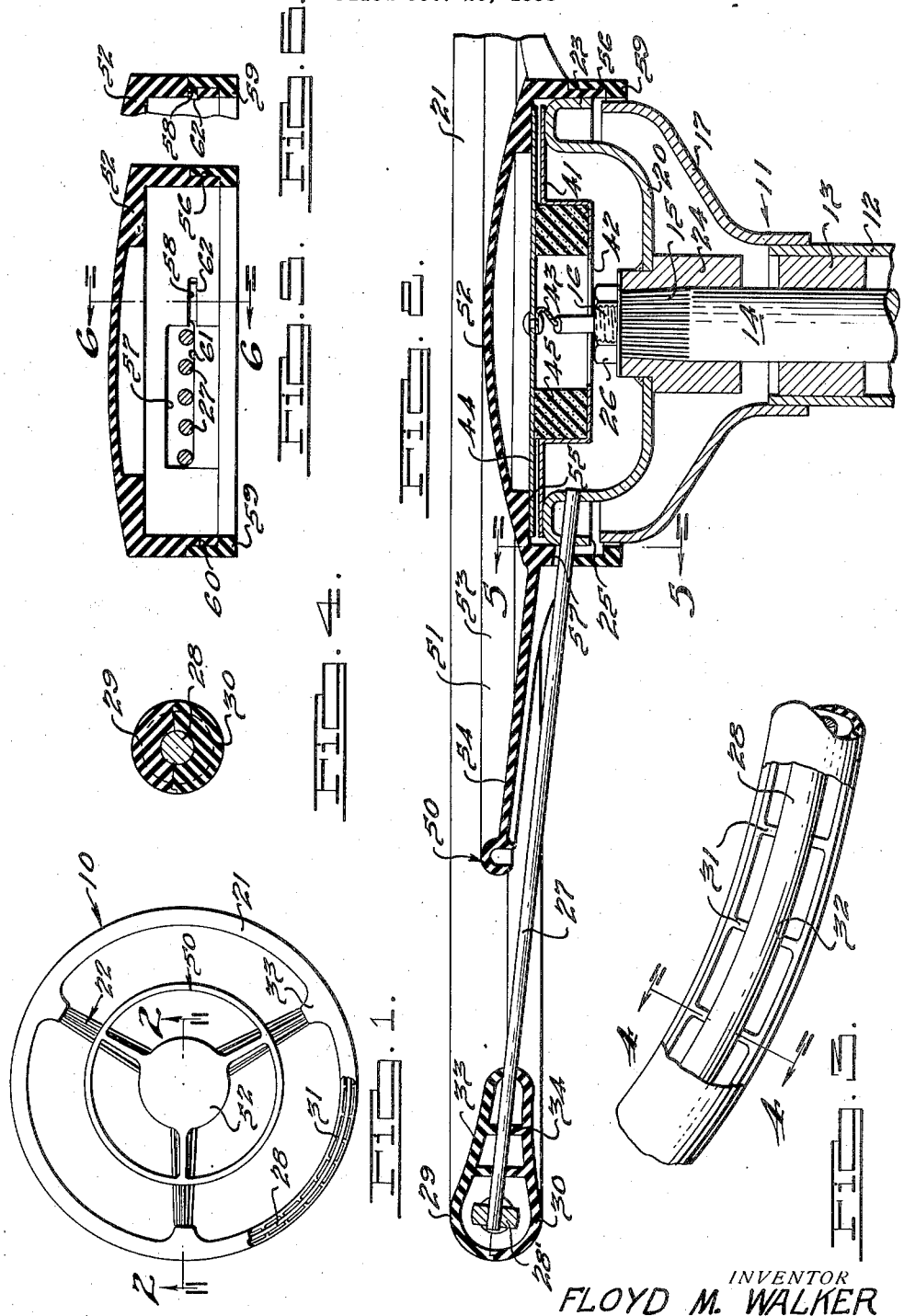
INVENTOR
FLOYD M. WALKER
BY
ATTORNEYS.

Patented Sept. 24, 1940

2,215,677

UNITED STATES PATENT OFFICE 2,215,677

STEERING WHEEL

Floyd M. Walker, Detroit, Mich., assignor to Chrysler Corporation, Highland Park, Mich., a corporation of Delaware Application October 20, 1938, Serial No. 235,930

2 Claims. (Cl. 74—552)

This invention relates to improved hand wheels and mountings therefor.

More particularly, the invention pertains to steering wheels and steering wheel mountings and the like for motor vehicles.

The principal object of the invention resides in the provision of an improved steering wheel including a substantially hollow rim portion comprising reinforced convenable portions of plastic material of light and inexpensive construction which presents a pleasing appearance to the eye as well as feeling warm to the hand of the vehicle operator at all times.

Further objects of the invention are to provide an improved steering wheel of this kind which includes an all-plastic molded horn switch control ring by which the beauty of the steering wheel is enhanced and which does not require a complicated metal core or reinforcing member; and to provide an improved means for mounting a horn control ring of this kind by which the ring is securely mounted directly on the hub portion of the steering wheel.

Additional objects of the invention are to provide in a steering wheel of this kind a horn control switch having its electrical contacts yieldingly urged apart by a non-conducting resilient member; and to provide a non-conducting resilient member for a horn ring equipped steering wheel which not only urges one of a pair of electrical contacts away from the other and electrically insulates these contacts from each other, but also urges the horn switch control ring away from the spokes of the steering wheel into a locking recess to prevent unintentional disengagement of the horn ring from the steering wheel.

Further objects of the invention are to provide in a mounting for a steering wheel a bell-shaped shroud carried by the steering column jacket of the vehicle, which shroud is adapted to enshroud the lower face of the hub portion of the steering wheel, whereby the shroud can be painted and handled in an inexpensive manner along with the steering column rather than requiring an elaborate finish to match the steering wheel; and to provide a steering wheel and mounting which is light, inexpensive and efficient.

Other objects and advantages of the invention will be more apparent from the following description taken in connection with the accompanying drawing, in which:

Fig. 1 is a plan view of a steering wheel and mounting embodying the invention, a portion of the rim being broken away to show certain details thereof.

Fig. 2 is an enlarged vertical sectional view taken as indicated by the line 2—2 of Fig. 1.

Fig. 3 is an enlarged fragmentary view of the broken away portion of the steering wheel rim shown in Fig. 1.

Fig. 4 is a vertical sectional view taken on the line 4—4 of Fig. 3.

Fig. 5 is an enlarged vertical sectional view taken approximately as indicated by the line 5—5 of Fig. 2.

Fig. 6 is a detail vertical sectional view taken along the line 6—6 of Fig. 5.

In the form of the invention illustrated in the drawing, the improved steering wheel and mounting, generally designated by the numerals 10 and 11 respectively, is but one type generally used for motor vehicles and other types of mountings, steering wheels, hand wheels and the like may be used if desired.

The improved steering wheel mounting 11 comprises a stationary steering column jacket 12 which has a journal member 13 which rotatably supports a tubular shaft 14 for actuating the steering mechanism (not shown) of a motor vehicle in a manner well-known to those familiar with the art. The shaft 14 has longitudinally extending tapered splines 15 and a reduced threaded end portion 16 for drivingly connecting the steering wheel 10 to the shaft 14. Fixed to the end of the jacket 12 is a bell-shaped shroud member 17 which is adapted to enshroud a portion of the hub of the steering wheel as well as the fastened end of the shaft 14.

The steering wheel 10 comprises a dish-like hub portion 20 which opens away from the end of the shaft 14, a substantially hollow peripheral rim portion 21 and a plurality of radially extending spokes 22 for interconnecting the hub portion 20 and the rim portion 21. The hub portion 20 has an overlapping outer portion 23 and includes a splined central portion 24 which engages the splines 15 of the shaft 14 to hold the hub portion 20 centrally on the shaft 14 and to provide a clearance 25 between the shroud member 17 and the overlapping portion 23 of the hub portion 20 to permit relative rotation therebetween. A nut 26 threadedly engages the threaded reduced end portion 16 of the shaft 14 to hold the hub portion 20 at the desired axial position on the shaft 14. Each of the spokes 22 is composed of a group of five wires 27 disposed in fan-shape self-supporting arrangement. The rim portion 21 preferably includes a reinforcing core ring 28 having flattened portions 28' to which the spokes 27 are suitably secured as by welding (best shown in Fig. 2).

The rim portion 21 further includes a pair of convenable ring-like portions 29 and 30 of moldable plastic material. Each of the convenable portions 29 and 30 has a plurality of aligned circumferentially spaced web portions 31 provided with semi-cylindrical openings 32 to clampingly receive the core ring 28. Formed on the convenable portions 29 and 30 are also radially inwardly extending spoke receiving portions 33 provided with inner web portions 34 to receive the spokes 27 between the mating faces of the convenable portions and to provide a rigid structure. Any suitable means, such as cement, may be employed to unite the convenable portions 29 and 30 of the rim portion 21.

The convenable portions 29 and 30 may be made of any suitable plastic material that will give the desired properties of strength, lasting color and the like. It has been found desirable to mold the plastic material for the convenable portions by the injection process, although other processes may be employed. It will be noted that the rim portion 21 is substantially hollow and presents, by reason of the low heat-conducting property of plastic material, an improved steering wheel rim that feels warm at all times to the hand of the vehicle operator even under low temperature conditions. Furthermore the steering wheel is light and inexpensive by reason of the fact that the rim portion 21 is substantially hollow and does not require as much plastic material as a solid rim portion would.

Disposed within the open portion of the hub portion 20 is a dish-like electrical contact element 41 which is electrically grounded to the vehicle and supported on the upper face of the hub portion 20 and has a central aperture 42 through which extends a lead 43. The lead 43 is housed within the shaft 14 and is electrically connected to the vehicle horn (not shown). Directly above the contact element 41 is a disc-like electrical contact element 44 which has electrically connected thereto the lead 43. Disposed between the contact elements 41 and 44 is an annular member 45 of a suitable non-conducting resilient material, such as sponge rubber, which both yieldingly urges the upper contacting element from the lower one and electrically insulates the contact elements from each other. When the periphery of the upper contact element 44 is moved downwardly into contact with the contact element 41, an electrical circuit is closed which operates the vehicle horn in a well-known manner.

A suitable horn control such as the one indicated by the numeral 50 may be mounted on the steering wheel 10 to electrically close the contacts 41 and 44 to blow the vehicle horn. The horn control 50 comprises an all-plastic molded horn switch control ring 51 which includes a dish-like hub portion 52 and a rim portion 53 interconnected by radially extending spokes 54. The horn ring hub portion 52 acts as a housing for the contact elements 41 and 44 and for the upper portion of the steering wheel hub portion 20. Formed on the inner portion of the horn hub portion 52 is an annular shoulder 55 which bears against the upper contact element 44. On the lip of the horn hub portion 52 is an annular external recess 56 and a plurality of spoke-receiving recesses 57 each of which is so constructed and arranged as to slidably receive therein one of the groups of steering wheel spokes 22 to permit axial movement of the horn ring relative to the steering wheel. Formed on the annular shoulder 56 of the horn hub portion 52 are three circumferential slots 58 which open at one end with one of the recesses 57. An annular retaining member 59, preferably formed of the same moldable plastic material as the steering wheel rim portion 21, has an annular internal recess 60 which receives the shoulder 56 of the horn hub portion 52. The retaining member 59 also has recesses 61 which register with the spoke-receiving recesses 57 of the horn hub portion 52. Formed on the annular recess 60 of the retaining member 59 are three circumferentially extending lugs 62 which register at one end with one of the recesses 61.

In assembling the horn hub portion 52 on the steering wheel 10, the former is pressed downwardly with even pressure against the action of the yieldable member 45 so that the groups of steering wheel spokes 22 are completely within the recesses 57 of the horn hub member 52, and then the retaining member 59 is seated over the shoulder 56 with the lugs 62 adjacent the recesses 57, and then the retaining member is rotated about its axis until the lugs 62 lockingly engage the recesses 58. The lugs 62 and the recesses 58 function as bayonet type locking portions and detachably secure the horn control ring 51 directly to the hub portion 20 of the steering wheel 10 in a simple and inexpensive manner. The yieldable member 45 then urges the horn hub portion 52 upwardly and the spoke members 27 thereby engage the side faces of the recesses 61 of the retaining member 59 to prevent unintentional disengagement of the bayonet type locking portions when the ring 51 is tilted about the yieldable member 45 to move the contact element 44 into engagement with the lower contact element 41.

To disengage the horn hub portion 52 from the retaining member 59, the former is pressed axially against the yieldable member until the steering wheel spokes 27 leave the recesses 61 of the retaining member, and then the retaining member is rotated about its axis to disengage the bayonet type locking portions.

The improved steering wheel and mounting effects a light and inexpensive construction which presents a pleasing appearance to the eye as well as a warm feeling to the hand of the vehicle operator. The horn ring 51 does not require a complicated metallic core or reinforcing member and can be quickly attached and detached from the steering wheel assembly for inspection.

The novel yieldable member 45 not only yieldingly urges one of the contact elements 44 and the horn ring 51 away from the contact element 41 and electrically insulates the contacts 41 and 44 from each other, but also urges the horn ring 51 axially upwardly to move the steering wheel spokes 27 into suitable locking recesses 61 to prevent unintentional disengagement of the horn ring 51 from the steering wheel 10.

The bell-shaped shroud member 17 is particularly novel in that it is carried by the steering column jacket 12 instead of by the steering wheel 10, and can be handled in the same manner as the steering column rather than requiring an expensive and elaborate finish to match the steering wheel.

Although but one specific embodiment of the invention is herein shown and described, it will be understood that various changes in the size, shape and arrangement of parts may be made without departing from the spirit of the invention.

I claim:

1. In a steering wheel and support assembly for a vehicle, a stationary steering column jacket, a shaft journalled within said jacket; a hand wheel comprising a hub portion non-rotatably secured to said shaft, a rim portion, means for interconnecting said hub and rim portions, and a shroud member fixed to the end of said jacket adjacent said hub portion and enshrouding one face of said hub portion and also the end of said shaft.

2. In a steering wheel and support assembly for a vehicle, a stationary steering column jacket, a shaft journaled within said jacket, a hand wheel including a hub portion non-rotatably secured to said shaft, a shroud member fixed to the end of said jacket adjacent said hub portion and enshrouding one face thereof, a horn ring structure carried by said hub portion and having a shroud portion for enshrouding the upper portion of said shroud member.

FLOYD M. WALKER.